(12) United States Patent
Riseth

(10) Patent No.: US 12,523,317 B2
(45) Date of Patent: Jan. 13, 2026

(54) VALVE AND A METHOD OF CONTROLLING FLUID FLOW BETWEEN A FLUID SUPPLYING DEVICE AND A FLUID RECEIVING DEVICE

(71) Applicant: MH Tech AS, Stavanger (NO)

(72) Inventor: Roar Førland Riseth, Stavanger (NO)

(73) Assignee: MH Tech AS, Stavanger (NO)

( * ) Notice: Subject to any disclaimer, the term of this patent is extended or adjusted under 35 U.S.C. 154(b) by 18 days.

(21) Appl. No.: 18/577,359

(22) PCT Filed: Jul. 5, 2022

(86) PCT No.: PCT/NO2022/050165
§ 371 (c)(1),
(2) Date: Jan. 8, 2024

(87) PCT Pub. No.: WO2023/282766
PCT Pub. Date: Jan. 12, 2023

(65) Prior Publication Data
US 2024/0191811 A1    Jun. 13, 2024

(30) Foreign Application Priority Data
Jul. 9, 2021  (NO) .................................... 20210891

(51) Int. Cl.
*F16K 31/122*    (2006.01)
*F16K 21/04*     (2006.01)

(52) U.S. Cl.
CPC ............ *F16K 31/122* (2013.01); *F16K 21/04* (2013.01)

(58) Field of Classification Search
CPC ...... F16K 31/122; F16K 21/04; E21B 21/019; E21B 21/106; E21B 34/108
See application file for complete search history.

(56) References Cited

U.S. PATENT DOCUMENTS 3,794,112 A * 2/1974 Hill ...................... E21B 34/108
  166/321
4,109,725 A * 8/1978 Williamson .......... E21B 49/001
  166/321

(Continued)

FOREIGN PATENT DOCUMENTS

CN    102839941 A    12/2012
NO    20170235 A1    8/2018

OTHER PUBLICATIONS

Norwegian Application No. 20210891, Norwegian Search Report dated Feb. 7, 2022, 2 pages.

(Continued)

*Primary Examiner* — Umashankar Venkatesan
(74) *Attorney, Agent, or Firm* — Andrus Intellectual Property Law, LLP

(57) ABSTRACT

A valve and a method are for controlling fluid flow between a fluid supplying device and a fluid receiving device. The valve has an inlet for connection to the fluid supplying device, and an outlet. The valve has a piston arrangement slidable with respect to a valve body between a closed first position, and an open second position providing fluid communication between the inlet and the outlet upon exposure to a fluid pressure exceeding a predetermined level. The piston arrangement has a first piston area when the valve is in the closed first position, and an additional second piston area when the valve is in the open second position. The valve further has a restrictor arrangement for delaying closing of the valve to allow a fluid supply pressure to bleed off.

17 Claims, 10 Drawing Sheets

(56) References Cited

U.S. PATENT DOCUMENTS

| | | | |
|---|---|---|---|
| 4,378,612 A | | 4/1983 | Beers |
| 4,625,755 A * | | 12/1986 | Reddoch ............... E21B 21/106 |
| | | | 137/493.2 |
| 6,460,620 B1 * | | 10/2002 | LaFleur ................ E21B 21/106 |
| | | | 175/218 |
| 10,066,461 B2 * | | 9/2018 | Hardesty ............... E21B 34/063 |
| 10,167,701 B2 | | 1/2019 | Williamson, Jr. |
| 11,352,844 B2 * | | 6/2022 | von Gynz-Rekowski ................... |
| | | | E21B 21/08 |
| 2010/0051290 A1 * | | 3/2010 | Williford .............. E21B 21/106 |
| | | | 166/373 |
| 2011/0168410 A1 | | 7/2011 | Deboer |
| 2013/0043045 A1 * | | 2/2013 | George .................. E21B 21/10 |
| | | | 175/57 |

OTHER PUBLICATIONS

PCT/NO2022/050165, International Search Report and Written Opinion dated Sep. 28, 2022, 7 pages.
PCT/NO2022/050165, International Preliminary Report on Patentability dated Jun. 29, 2023, 4 pages.
Extended European Search Report issued in EP Application No. 22838095.2, dated Mar. 11, 2025.

\* cited by examiner

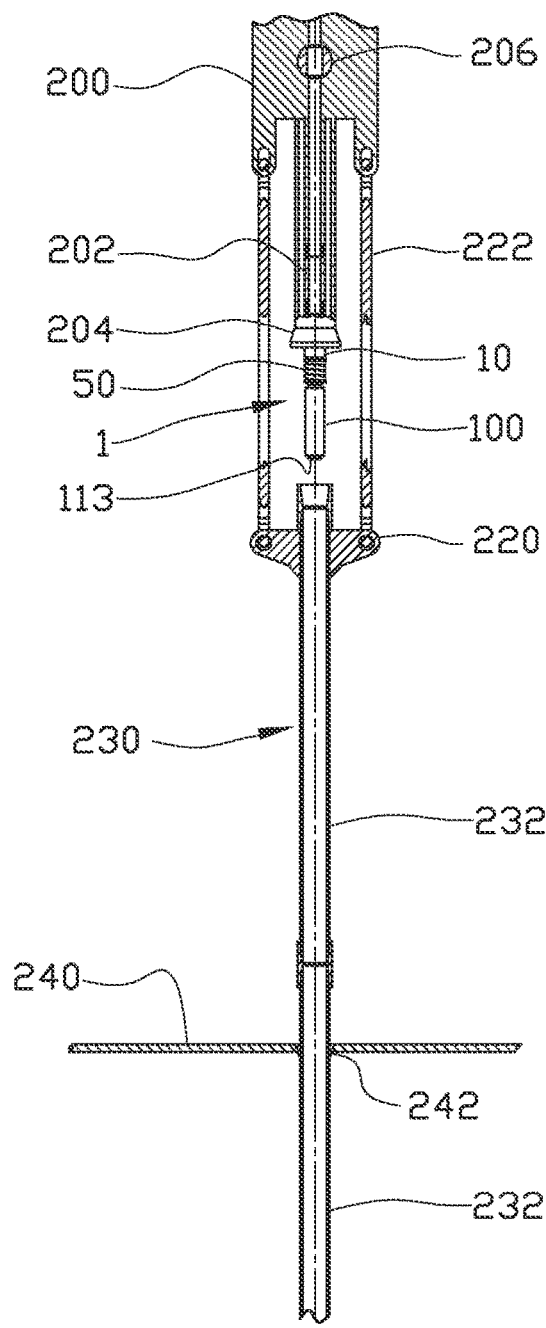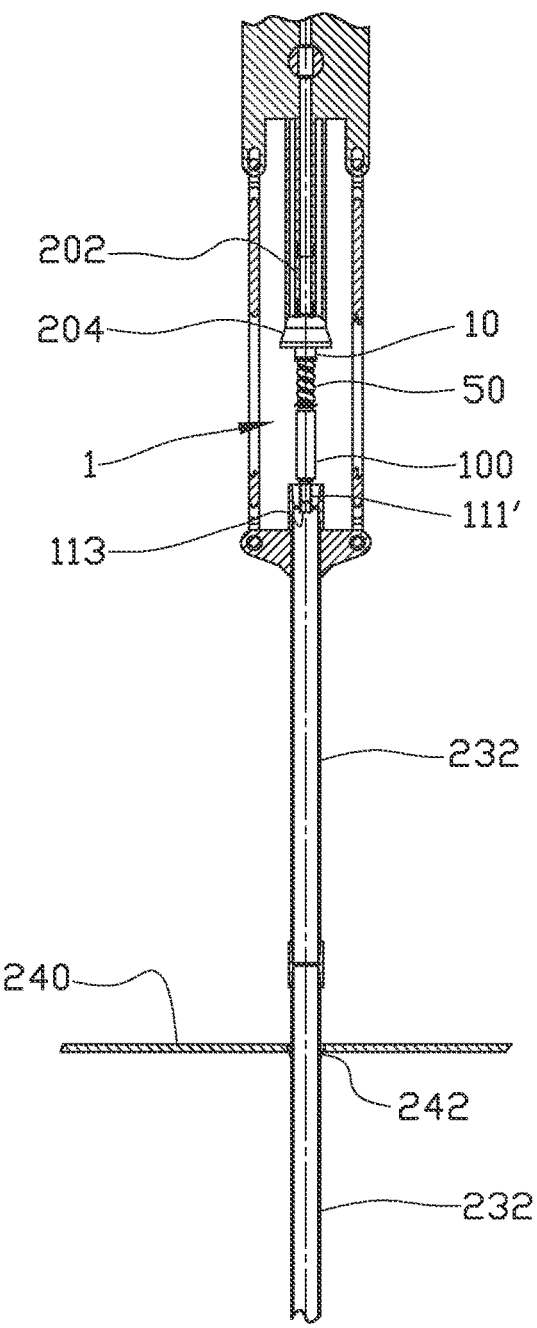
Fig. 8a
Fig. 8b

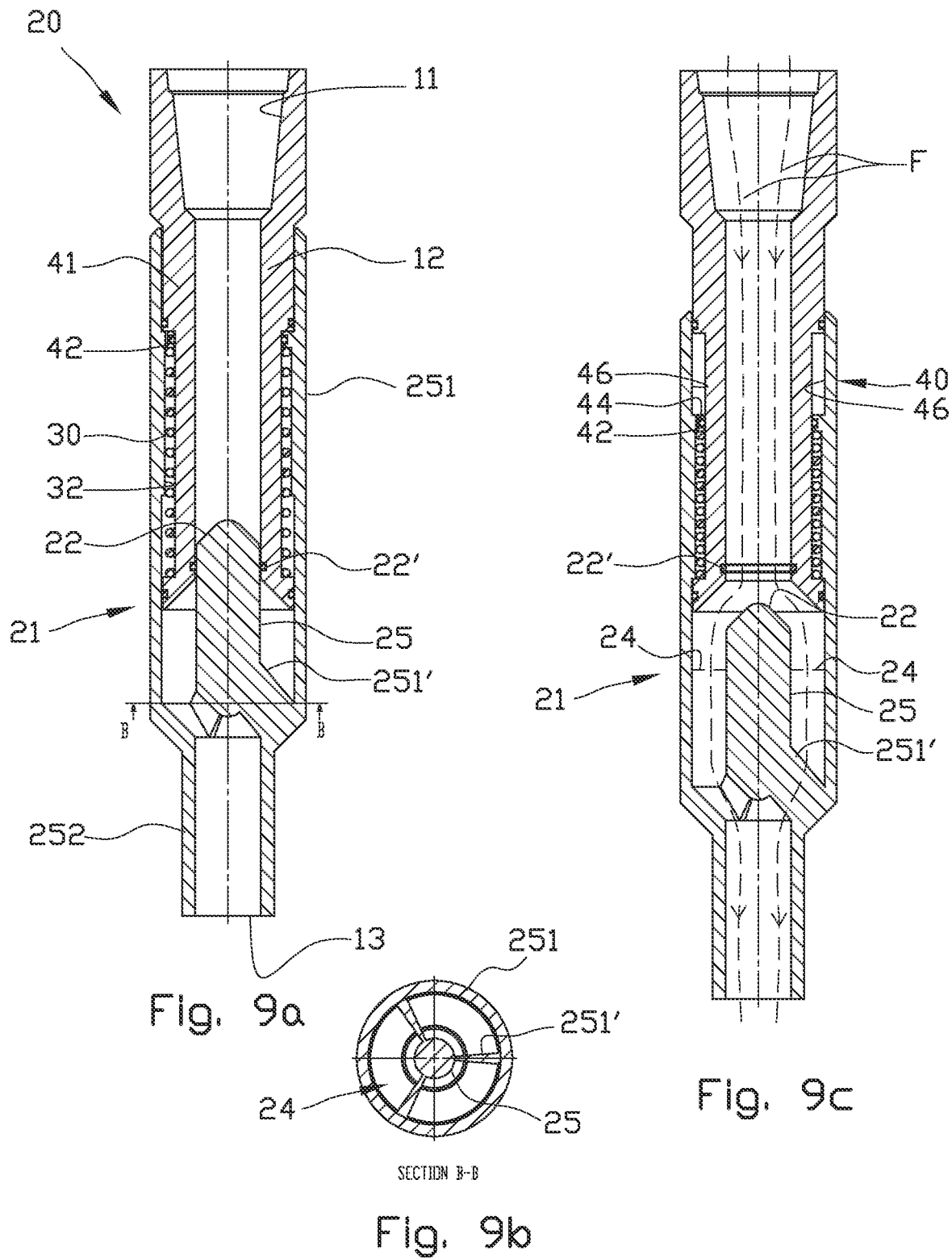

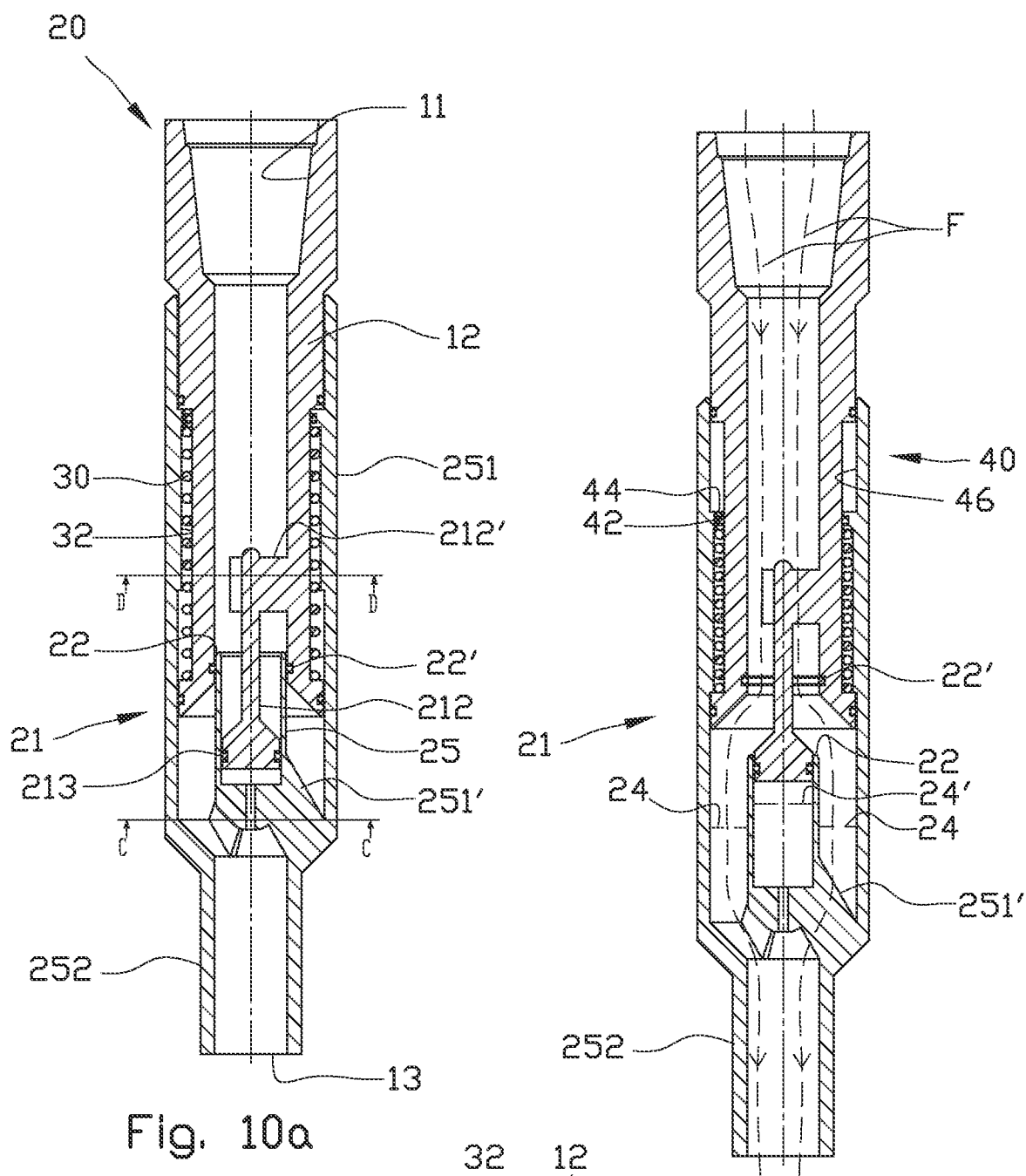
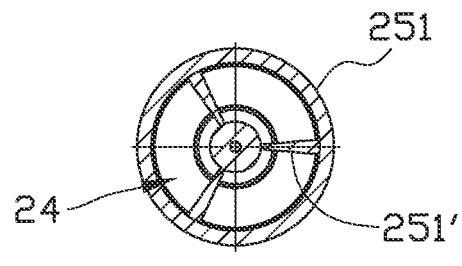
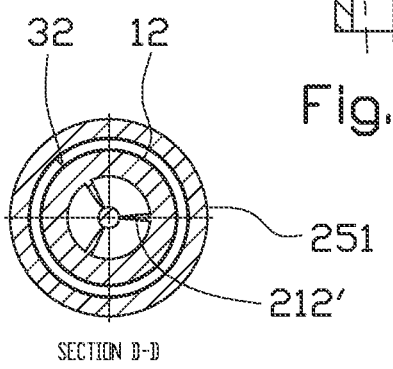
Fig. 10a  Fig. 10b  Fig. 10c  Fig. 10d

VALVE AND A METHOD OF CONTROLLING FLUID FLOW BETWEEN A FLUID SUPPLYING DEVICE AND A FLUID RECEIVING DEVICE

CROSS-REFERENCE TO RELATED APPLICATIONS

This application is the U.S. national stage application of International Application No. PCT/NO2022/050165, filed Jul. 5, 2022, which international application was published on Jan. 12, 2023 as WO 2023/282766 in the English language. The International Application claims priority to Norwegian Patent Application No. 20210891, filed Jul. 9, 2021. The international application and Norwegian application are both incorporated herein by reference, in their entirety.

FIELD

The present disclosure is related to a valve. More specifically, the disclosure is related to a valve and a method of controlling fluid flow between a fluid supplying device and a fluid receiving device. The valve has an inlet for connection to the fluid supplying device and for receiving a fluid therefrom, and an outlet. The valve, which is controlled by fluid pressure, is configured for being in a closed first position preventing fluid from passing the valve upon exposure to a fluid pressure being below a predetermined level, and for being in an open second position providing fluid communication between the inlet and the outlet upon exposure to a fluid pressure exceeding the predetermined level.

BACKGROUND

The valve disclosed herein is developed primarily in response to a need in the petroleum industry. More particularly, the valve is developed for facilitating fluid transfer between a top drive of a drilling rig and a casing, liner, or drillpipe during a casing-, liner-, or drillpipe running operation. In a casing running operation, a lowermost casing joint of a casing string has been sealed off. A purpose of supplying a fluid during a casing running operation is to fill a casing with a balancing fluid, as will be appreciated by a person skilled in the art.

A conventional method of filling a casing is to run several casing joints, typically six to eight, into the well and then stop the running operation to fill a balancing fluid into the casing string. The filling may be performed by lowering the top drive onto the top portion of the casing string, or by means of a hose from a drilling floor. This conventional method is undesired for numbers of reasons. Firstly, the method requires the running operation to be interrupted. An interruption of the running operation represents a risk of the casing string getting stuck in the bore hole. Secondly, the conventional method is relatively time consuming and thus expensive. Filling a casing string by means of a hose on a deck of an installation requires personnel to enter the so-called red zone of the drilling rig. Personnel working in the red zone of a drilling rig is subject to a substantial risk of serious incidents related to remotely operated equipment and dropped objects.

Publication US2011168410 A1 discloses a drill string flow control valve that comprises a valve housing, a valve sleeve axially movable within a valve housing from a closed position to an open position, a biasing mechanism biasing the valve sleeve into a closed position, and a plurality of pressure vents for allowing a differential pressure to be exerted on the valve sleeve.

Publication CN102839941 A1 discloses an extensible tubing that is extended in two steps. The extensible tubing comprises a first compression spring and a second compression spring. The extensible tubing operates as an on/off valve and requires a fluid supply pressure to be bled of upstream of the valve to allow closing of the valve.

When supplying a fluid to, for example, a casing or drill string extending from a rig in a running operation, the fluid supplying device may typically comprise a Kelly hose being in fluid communication with a source of fluid. In such an application on a rig, the hydrostatic column may be considerable, for example 40 meters.

To control fluid communication between the fluid source on the rig and a fluid receiving device, for example a casing, liner, or drillpipe, the supply of fluid (for filling a casing or drill pipe) may be controlled by means of the fluid supplying device itself, typically by means of an IBOP valve (IBOP—Internal Blowout Preventer) arranged in a top drive of the rig. Such an IBPO would be capable of holding a fluid column. However, an IBOP valve is a safety device that should be used in an emergency situation only, and a rig operator would normally not allow regular use of an IBOP valve for controlling fluid supply in a casing running operation, or in a drilling operation. Thus, a conventional valve may be arranged at an outlet of the fluid supplying device. A valve arranged at an outlet of the fluid supplying device must be capable of holding a hydrostatic column when there is no flow through the fluid supplying device. A valve for the aforementioned purpose may be manually operated. However, a pressure-controlled valve is preferred on a rig to avoid having operators located in a so-called red sone of the rig. A pressure-controlled valve is in its closed position when exposed to a fluid pressure force being less than a predetermined value, and in its open position when exposed to a fluid pressure force being higher than a predetermined value. Thus, to open such a valve, the fluid pressure force must exceed the hydrostatic pressure force at which the valve is designed to open. An increased fluid pressure is typically provided by means of a pump forming part of the fluid supplying device. The increased fluid pressure may result in a considerable differential pressure across the valve, which may result in increased erosion of the valve, and thus reduced operating lifetime of the valve. Further, a considerable differential pressure across the valve may result in turbulent flow and cavitation downstream of the valve.

There is therefore a need for a pressure-controlled valve that in a closed position is capable of holding a predetermined hydrostatic pressure force while the fluid is stationary, i.e., not flowing, and in a fully open position while the fluid is flowing with a pressure being lower than a pressure required for initially opening the valve.

SUMMARY

The object of the invention is to remedy or to reduce at least one of the drawbacks of the prior art, or at least to provide a useful alternative to prior art.

The object is achieved through features specified in the description below and in the claims that follow.

The invention is defined by the independent patent claims. The dependent claims define advantageous embodiments of the invention.

In a first aspect of the invention, a valve for controlling fluid flow between a fluid supplying device and a fluid receiving device is provided, the valve having an inlet for connection to the fluid supplying device and for receiving a fluid therefrom, and an outlet, wherein the valve comprises a piston arrangement slidable with respect to a valve body, wherein the piston arrangement is slidable between a closed first position preventing fluid from passing the valve upon exposure to a fluid pressure being below a predetermined level, and an open second position providing fluid communication between the inlet and the outlet upon exposure to a fluid pressure exceeding the predetermined level. The piston arrangement has a first piston area when the valve is in the closed first position, and an additional second piston area when the valve is in the open second position. The valve further comprises a sealed restrictor arrangement for delaying closing of the valve to allow a fluid supply pressure to bleed off.

One effect of providing a piston arrangement having a first piston area when the valve is in the closed first position, and an additional second piston area when the valve is in the open second position, is that a fluid pressure required for keeping the valve in the open second position (while maintaining a fluid flow) is less than the fluid pressure required for opening the valve. Thus, a differential pressure across the valve may be reduced, whereby less power is required for pumping. A reduced differential pressure across the valve may also have a positive effect on any erosion of the valve, and thus on the operating lifetime of the valve. A reduced differential pressure across the valve may further have a positive effect with respect to reduced turbulent flow and reduced cavitation.

Providing the valve with a restrictor arrangement for delaying closing of the valve has the effect that the piston arrangement does not immediately return from its open second position to its closed first position when the pressure of the fluid upstream of the valve is reduced below the predetermined level. Thereby, a fluid supply pressure in the fluid supplying device is allowed to bleed off before the valve arrives at its first, closed position.

In one embodiment is the restrictor arrangement configured for reducing the closing speed of the valve. The valve may return from its open second position to its closed first position at a substantially constant speed.

In an alternative embodiment, the restrictor arrangement may comprise a closing delay nozzle configured for communicating a fluid between two or more fluid reservoirs in response to movement of the piston arrangement. Such fluid reservoirs may, for example, comprise two or more annular chambers surrounding the piston arrangement and containing an incompressible fluid, such as an oil. A closing delay nozzle may further be configured for delaying return of the piston arrangement from its open second position to its closed first position until a predetermined time has lapsed after the pressure of the fluid upstream of the valve has been reduced below the predetermined level.

Such a delay nozzle may for example be based on a principle disclosed in patent publication U.S. Pat. No. 4,378,612 related to a delayed action door closer.

In addition to the area of the first piston and the additional area of the second piston, characteristics of a valve biasing means may define, and thus control, said predetermined level of fluid pressure. As will be appreciated by a person skilled in the art, the characteristics of a biasing means, for example a spring, is the dependence of deflection of the spring versus loading force. In one embodiment, the valve biasing means is arranged in a chamber defined between a portion of the piston arrangement and the valve body.

In one embodiment, the piston arrangement is surrounded by the valve body in the form of a housing. In an alternative embodiment, the valve body is surrounded by a portion of the piston arrangement.

In one embodiment, the piston arrangement of the valve comprises a hollow piston member provided with at least one aperture in a wall of the hollow piston member, and wherein the at least one aperture is provided in a portion of said wall defined between the first piston area and the additional second piston area. When the valve is in its open second position, fluid communication between the inlet and the outlet is thus provided via the at least one aperture, whereby the piston member is utilized as a tubing for flowing fluid through the outlet of the valve.

In one embodiment, the piston member is solid in the meaning that any fluid flowing between the inlet and the outlet flows on an outside of the piston member.

It should be noted that in the embodiments disclosed above, the outlet of the valve is axially displaceable with the respect to the valve body and thus the inlet of the valve, meaning that the valve is extended when moving from its closed first position to its open second position.

The fluid supply pressure is the pressure provided by a pumping device associated with the fluid supplying device and any hydrostatic pressure within the fluid supplying device. By bleeding off the fluid supply pressure, only hydrostatic pressure remains upstream of the present valve. Thereby, the valve may resist any additional pressure that may arise due to mass acceleration of the fluid column acting on the valve. Such an acceleration may typically arise when a top drive, and thus the associated fluid supplying device, is moved vertically.

The valve may be operatively connected to the fluid supplying device, which typically may comprise a Kelly hose.

In one embodiment, the valve forms part of an extensible tubing having a first tubing portion and a second tubing portion, wherein the first tubing portion comprises the valve, and wherein the outlet of the valve is configured for controlling fluid flow into an inlet of the second tubing portion.

In such an embodiment, the second tubing portion may comprise:
- a housing having a first end portion for receiving fluid from the outlet of the valve, and a second end portion;
- a core arranged inside the housing and secured thereto;
- a pipe arranged between the housing and the core, the pipe being axially movable between a retracted position wherein a seal prevents fluid from passing between the core and the pipe, and an extended position wherein the seal does not prevent fluid from passing between the core and the pipe;
- a piston forming a part of the pipe; and
- a second tubing portion biasing means configured for urging the pipe towards its retracted position;
- wherein the pipe is movable towards its extended position upon exposure to a fluid flowing from the first tubing portion into the second tubing portion and providing a fluid pressure force exceeding an opposite force from the second tubing portion biasing means.

The piston may comprise a transition zone from a larger first pipe portion having a first flow area, and a smaller second pipe portion having a second flow area being smaller than the first flow area.

As such, the piston may be formed by a transition zone from a larger first pipe portion having a first flow area defined between the first pipe portion and the core, and a smaller second pipe portion having a second flow area defined between the second pipe portion and the core, the second flow area being smaller than the first flow area; and
wherein the seal is configured for sealing between the smaller second pipe portion and the core when the pipe is closer to its retracted position than to its extended position Thus, when a force from a fluid pressure acting on the piston is less than a force from the valve biasing means, fluid is prevented from passing through the extensible tubing, and when a force from a fluid pressure acting on the piston is larger than a force from the valve biasing means, the second tubing portion is urged towards its extended position wherein fluid passes through the extensible tubing, whereby fluid is communicated between the fluid supplying device and the fluid receiving device.

A valve according to the invention, which forms part of such an extensible tubing, may facilitate transfer of fluid between a fluid supplying device and a fluid receiving device. The fluid supplying device may, for example, be arranged on a rig and configured for supplying fluid to a casing during a casing running operation (as discussed above), or to a drill string.

As disclosed above, the piston of the second tubing portion may be formed by means of a transition zone between a large bore piping portion having a first flow area, and a small bore piping portion having a second flow area being smaller than the first flow area. The terms large bore and small bore do not define any specific dimensions, but a mutual relationship between the flow areas on either side of the transition zone. Thus, for a piping having a circular cross-sectional flow area defined by an inner wall of the piping, the large bore piping portion is a first piping portion having a first internal diameter, and the small bore piping portion is a second piping portion having a second internal diameter being smaller than the first internal diameter. The flow areas are defined by any space between an external surface of the core and an internal surface of the piping portions. Therefore, the piston may comprise a transition zone from a larger first pipe portion having a first flow area, and a smaller second pipe portion having a second flow area being smaller than the first flow area.

In a preferred embodiment of the valve forming part of an extensible tubing, a cross sectional area defined by an external surface of the core is smaller than a cross sectional area defined by an internal surface of the smaller second pipe portion, thereby providing a radial gap for allowing fluid flow between the core and the smaller second pipe portion. This has the effect of defining a space or gap between the smaller second pipe portion and the core, wherein the gap depends on an axial position of the second tubing portion with respect to the core. Thereby, fluid can flow through the tubing until the seal prevents fluid from passing between the core and the pipe. Thus, at least some of the fluid within the tubing is allowed to drain during retraction of the pipe. A retraction of the pipe occurs when the pressure force against the piston of the pipe is less than the force from the second tubing portion biasing means configured for urging the pipe towards its retracted position.

In a further embodiment, the smaller second pipe portion has a free end, and the seal is arranged within the smaller second pipe portion closer to its free end than to the piston. This advantageously facilitates drainage during retraction of the pipe. In one embodiment, the tubing is arranged so that the closer the seal is to the free end of the smaller second pipe portion, the more fluid is allowed to drain from the tubing before the seal prevents fluid communication out of the tubing.

Preferably, the core has a free end portion pointing away from the first tubing portion, and wherein the piston is positioned axially downstream of the free end portion of the core when the pipe is in its extended position, i.e., the piston is positioned on the pipe so as to extend beyond the free end portion of the core when the pipe is in its extended position. When in the extended position, this has the effect of the smaller second pipe portion being located axially downstream of the free end portion of the core. Thereby, a maximum flow through the tubing is achieved when the pipe is in its extended position.

As an alternative or addition to arranging the seal within the smaller second pipe portion and closer to its free end than to the piston, the seal may be arranged on a portion of the core at an axial position wherein the seal engages the smaller second pipe portion when the extensible tubing is closer to its fully retracted position than to its fully extended position. Thus, at least some of the fluid within the tubing is allowed to drain during retraction of the pipe. In one embodiment, the seal is arranged at an axial position of the core wherein the seal does not engage the smaller second pipe portion until the extensible tubing is fully retracted.

The axially movable pipe may be provided with a restrictor for providing a differential pressure in the fluid flowing into the axially movable pipe. Preferably, any such restrictor is arranged in the larger first pipe portion. One purpose of such a restrictor is to reduce a so-called "spray-effect" of the fluid passing the outlet of the axially moveable pipe. Another purpose of such a restrictor is to facilitate axial displacement of the axially movable pipe towards its extended position. A restrictor facilitating an axial displacement allows use of a heavy duty and more powerful biasing means. A heavy duty and more powerful biasing means may be advantageous with respect to returning the extensible tubing towards its retracted position.

In a preferred embodiment, the first tubing portion (which comprises the valve) is a separate tubing portion connected to the second tubing portion, hence is separable from the second tubing portion. One advantage of providing a first tubing portion being separable from the second tubing portion is that the valve, and thus the extensible tubing, can be adapted to various types of fluid supplying devices simply by selecting a first tubing portion mating with the fluid supplying device. In the event of any damage to, for example, the inlet of the first tubing portion (which comprises the valve), another advantage of providing a first tubing portion being separable from the second tubing portion is that only the first tubing portion needs to be replaced, and not the second tubing portion.

In one embodiment, the first tubing portion (which comprises the valve) is connected to the second tubing portion via a flexible pipe. One effect of connecting a separate, first tubing portion to the second tubing portion via a flexible pipe is that the flexible pipe may absorb any impacts that may arise during operation. A further effect is that the first tubing portion may, during operation, be non-coaxial with respect to the second tubing portion.

An important area of application of the present valve is to use the valve together with an extensible tubing for enabling continuous fluid transfer between a top drive of a drilling rig and a casing, liner, or drillpipe during a casing-, liner- or drillpipe running operation. Thus, the fluid supplying unit may comprise a so-called Saver Sub, while the fluid receiving device may be a top portion of a casing string subject to a running operation. Due to variable configurations of both the fluid supplying device and the fluid receiving device, a required length of extension of the tubing varies accordingly.

It is therefore advantageous if the flexible pipe is axially extensible between a retracted position and an extended position. Preferably, such an extensible, flexible pipe comprises a flexible pipe biasing means configured for urging the flexible pipe towards a retracted position upon exposure to an opposite tension force between the first tubing portion (which comprises the valve) and the second tubing portion being less than a biasing force of the flexible pipe biasing means. In one embodiment, the biasing means acting on the flexible pipe is separate from the flexible pipe. In an alternative embodiment, the biasing means acting on the flexible pipe is partly or fully integrated with the flexible pipe.

From the embodiments disclosed above, it should be clear that the extension of the tubing may be provided by means of the axially movable pipe of the second tubing portion, and by means of the extensible, flexible pipe arranged between the first tubing portion and the second tubing portion.

In a second aspect of the invention, a method of controlling fluid flow between a fluid supplying device and a fluid receiving device is provided, wherein the method comprises the steps of:
  providing a valve according to the first aspect of the invention; and
  connecting an inlet of the valve to the fluid supplying device.

The method may further comprise providing an extensible tubing according to the first aspect of the invention, said extensible tubing comprising a first tubing portion which the valve forms part of, and a second tubing portion comprising an axially displaceable pipe.

BRIEF DESCRIPTION OF THE DRAWINGS

In the following, examples of preferred embodiments are described and illustrated in the accompanying drawings, wherein:

FIG. 1b shows a longitudinal cross-sectional view of the valve in FIG. 1a;

FIG. 2b shows a longitudinal cross-sectional view of the valve in FIG. 2a;

FIG. 3b shows a longitudinal cross-sectional view of the valve in FIG. 3a;

FIG. 4b shows a longitudinal cross-sectional view of the tubing in FIG. 4a;

FIG. 5a shows the valve in FIG. 4b, wherein the valve in the top portion is shown immediately after being displaced to its open second position, and wherein the extensible tubing is still in a retracted position;

FIG. 5b shows a cross-sectional view through A-A in FIG. 5a;

FIG. 7b shows a longitudinal cross-sectional view of the assembly in FIG. 7a;

FIG. 8a shows, in a smaller scale and partially in cross-section, an example of using the valve according to an embodiment of the invention, wherein the valve and an extensible tubing connected to the valve are in retracted positions above a top portion of a casing string during a running operation;

FIG. 8b shows the extensible tubing in FIG. 8a extended into the top portion of a casing string during the running operation;

FIG. 9a shows a longitudinal cross-section of an alternative embodiment of the valve, wherein the valve is in a closed first position with a portion of the piston member being in a retracted position within a body of the valve;

FIG. 9b shows a cross sectional view through B-B in FIG. 9a;

FIG. 9c shows the valve in FIG. 9a in an open second position with a piston member being in an extended position;

FIG. 10a shows a longitudinal cross-section of still another alternative embodiment of the valve, wherein the valve is in a closed first position;

FIG. 10b shows a cross sectional view through C-C in FIG. 10a;

FIG. 10c shows a cross sectional view through D-D in FIG. 10a; and

FIG. 10d shows the valve in FIG. 10a in an open second position.

DETAILED DESCRIPTION OF THE EMBODIMENTS

Figure 1A:
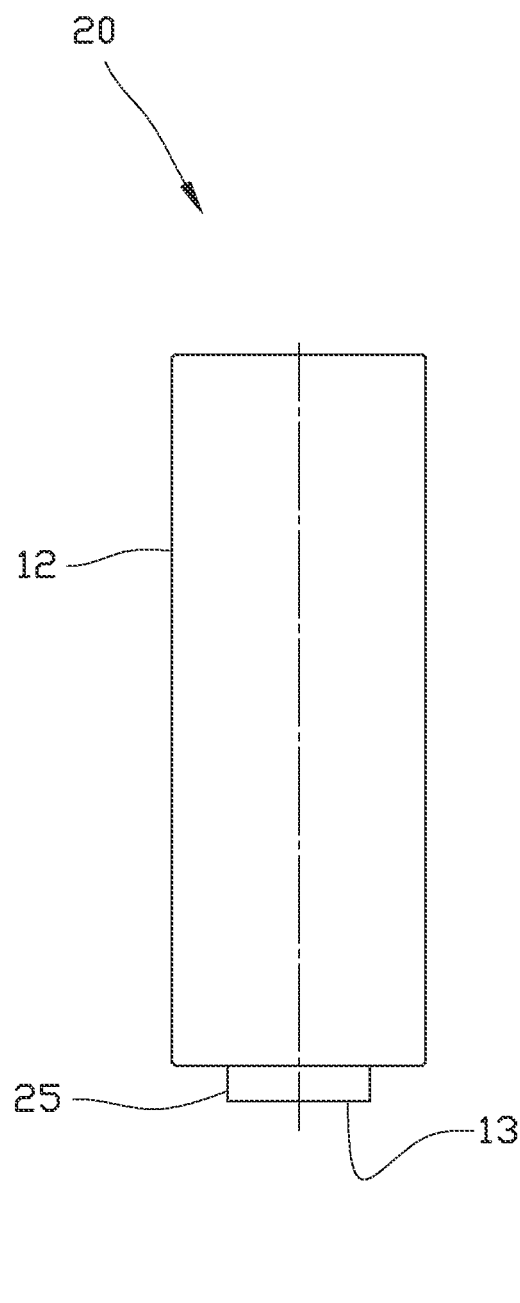
FIG. 1a shows a first embodiment of a valve according to the invention, wherein the valve is in a closed first position with a piston member being in a retracted position.

Positional indications refer to the positions shown in the figures. Similarly, denominations such as upstream and downstream refer to the position shown in the figures.

In the figures, same or corresponding elements are indicated by same reference numerals. For clarity reasons, some elements may be shown without reference numerals in some of the figures.

A person skilled in the art will understand that the figures are just principle drawings. The relative proportions of individual elements may also be distorted.

In the figures, reference numeral 20 denotes a valve according to the present invention.

The valve 20 has an inlet 11 for connection to a fluid supplying device, and an outlet 13 located axially opposite the inlet 11. The inlet 11 is in the form of a female receptacle provided with internal threads for mating with a male stab of a fluid supplying device, for example a saver sub 202, as shown in FIGS. 8a and 8b.

In the embodiment shown in FIGS. 1a to 2b, and 9a to 10d, the valve 20 has an outlet 13 that may be exposed to a fluid receiving device, i.e., the valve 20 may constitute an end portion of a fluid delivery device.

The valve 20 comprises a piston arrangement 21 slidable with respect to a valve body 12, wherein the piston arrangement 21 is slidable between a closed first position preventing fluid from passing the valve 20 upon exposure to a fluid pressure being below a predetermined level, and an open second position providing fluid communication between the inlet 11 and the outlet 13 upon exposure to a fluid pressure exceeding the predetermined level.

Characteristics of a valve biasing means, here in the form of a spring 30, define said predetermined level of fluid pressure. Thus, the valve 20 is a pressure-controlled valve. The spring 30 is housed within a chamber 32 defined between a portion of the piston arrangement 21 and the body 12 of the valve 20.

In FIGS. 1a to 2b, the piston arrangement 21 is surrounded by the valve body in the form of a housing 12. Thus, the chamber 32 is defined between a portion of the piston arrangement 21 and the housing 12.

In FIGS. 9a to 10d, a portion of the valve body 12 is surrounded by a portion of the piston arrangement 21. Said portion is hereinafter denoted piston housing 251.

Figure 1B:
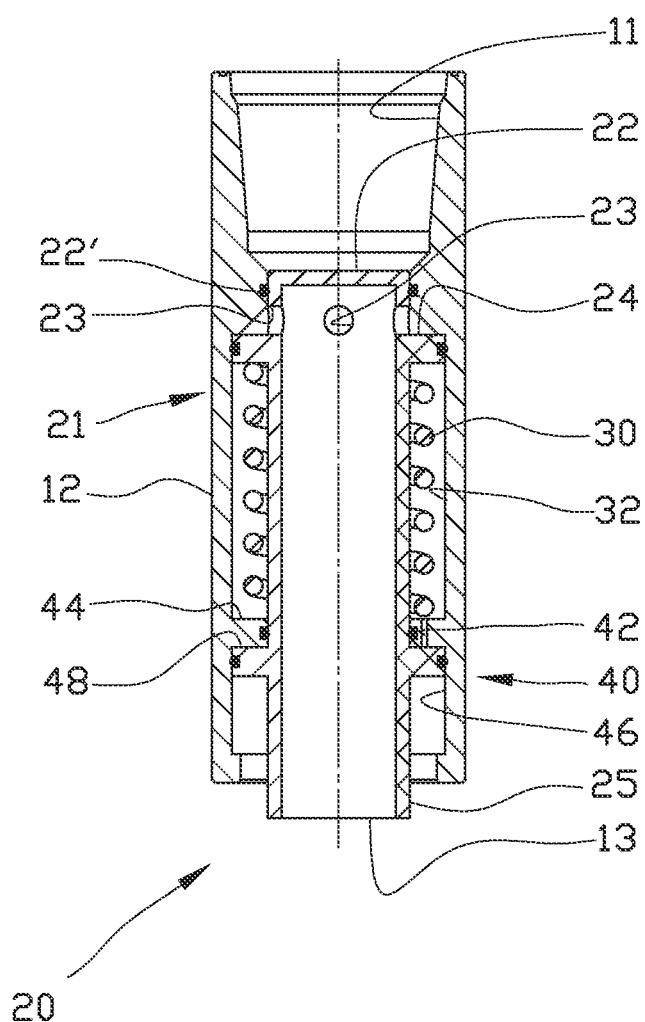

The piston arrangement 21 has a first piston area 22 facing the inlet 11 of the valve 20 when the valve 20 is in the closed first position, as seen for example in FIGS. 1b, 9a, and 10a. The piston arrangement 21 has an additional second piston area 24.

Figure 2A:
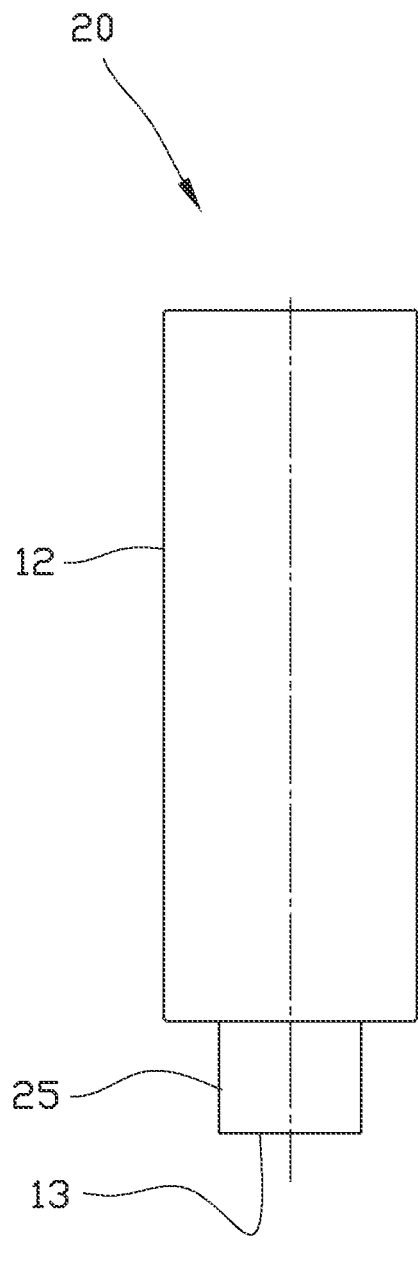
FIG. 2a shows the valve in FIG. 1a, wherein the valve is in an open second position with a piston member being in an extended position.
Figure 2B:
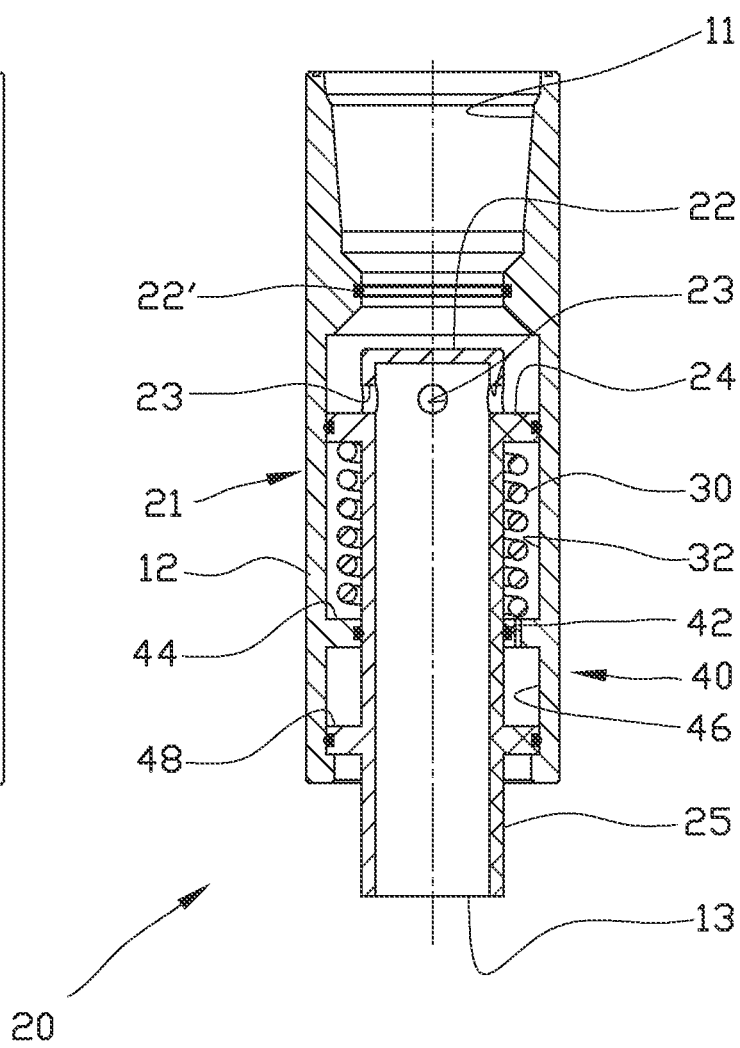

In the embodiment shown in FIG. 2b, for example, the additional second piston area 24, like the first piston area, faces the inlet 11 of the valve 20 when the valve 20 is in the open second position.

In the embodiments shown in FIGS. 9c and 10d, the additional second piston area 24 is arranged downstream of an annular gasket 22' arranged in a groove in a lower portion of the valve body 12. As will be discussed below, in the embodiment shown in FIGS. 10 to 10d, the additional second piston area comprises an additional annular second piston area 24, and an additional circular second piston area 24'.

Thus, when in a closed first position, as shown in FIGS. 1b, 9a and 10a, only the first piston area 22 of the valve 20 will be exposed to any fluid in the inlet 11. When the valve 20 is in the closed first position, the annular gasket 22' protects the additional annular second piston area 24, and the additional circular second piston area 24' shown in FIG. 10d, from any fluid in the inlet 11.

The piston arrangement 21 of the valve 20 shown in FIGS. 1b and 2b (and also in FIGS. 3a to 7b) comprises a piston member 25 that is hollow and being axially movable with respect to the body 12 of the valve 20. A major portion of the hollow piston member 25 is arranged inside the body 12, which in this embodiment forms a piston housing 12. The hollow piston member 25 is provided with apertures 23 in a wall thereof. In the embodiment shown, the number of apertures 23 is four (only three shown) separated at a 90° circumferential spacing. The apertures 23 are provided in a portion of the wall defined between the first piston area 22 and the additional second piston area 24. The number of apertures may be less or more than four, but at least one aperture.

In the alternative embodiment of the valve 20 shown in FIGS. 9a to 9c, the piston arrangement 21 comprises the piston housing 251, a piston member 25, and a piston outlet 252. The piston member 25 is solid so as to allow the fluid flowing between the inlet 11 and the outlet 13 to pass on an outside of the piston member 25 when the valve 20 is open, as indicated by dotted lines F in FIG. 9c. The piston housing 251, the piston member 25, and the piston outlet 252 are operatively connected to each other, wherein the piston member 25 is arranged between the piston housing 251 and the piston outlet 252. A portion of the piston housing 251 surrounds the body 12 of the valve 20. The piston arrangement 21 is axially movable with respect to the body 12 from a closed first position, as shown in FIG. 9a, and an open second position, as shown in FIG. 9c. The piston member 25 is secured to a lower portion of piston housing 251 via fins 251', as best seen in FIG. 9b.

The piston arrangement 21 has a first piston area 22 defined by the portion of the piston member 25 facing the inlet 11 of the valve 20, and an additional second piston area 24 defined between an inner surface of the piston housing 251 and an outer surface of a side portion of the piston member 25. In the embodiment shown, the additional second piston area 24 is annular and indicated by dotted lines 24 in FIG. 9c.

When the valve 20 is in the closed first position, as shown in FIG. 9a, any fluid pressure from the fluid supply device acts towards the first piston area 22 only. When the valve 20 is in the open second position, as shown in FIG. 9c, the fluid pressure acts on both the first piston area 22 and the additional second piston area 24.

Turning now to FIGS. 10a to 10d, which show another embodiment of the valve 20. Similar to the embodiment shown in FIGS. 9a to 9c, the piston arrangement 21 comprises a piston housing 251, a piston member 25, and a piston outlet 252. However, the piston member 25 is formed as a sleeve or ring piston 25 housing a portion of a static member 212, which is secured to a portion of the body 12 via fins 212' protruding from an inner portion of the body 12. The fins 212' are best seen in FIG. 10c. A seal 213 prevents fluid from passing between the ring piston 25 and the static member 212. When the valve 20 is in the open second position, as shown in FIG. 10d, the fluid flowing between the inlet 11 and the outlet 13 passes on an outside of the ring piston 25, as indicated by dotted lines F in FIG. 10d. The piston housing 251, the piston member (ring piston) 25, and the piston outlet 252 are operatively connected to each other, wherein the piston member 25 is arranged between the piston housing 251 and the piston outlet 252. A portion of the piston housing 251 surrounds the body 12 of the valve 20. The piston arrangement 21 is axially movable with respect to the body 12 from a closed first position, as shown in FIG. 10a, and an open second position, as shown in FIG. 10d. The piston member 25 is secured to a lower portion of piston housing 251 via fins 251', as best seen in FIG. 10b.

The piston arrangement 21 shown in FIGS. 10a to 10d has a first piston area 22 defined by the portion of the ring piston 25 facing the inlet 11 of the valve 20, and an additional annular second piston area 24 defined between an inner surface of the piston housing 251 and an outer surface of a side portion of the piston member 25 (ring piston 25), and an additional circular second piston area 24' defined by the inner wall of the ring piston 25. In the embodiment shown, the additional annular second piston area 24 and the additional circular second piston area 24' are indicated by dotted lines 24, 24' in FIG. 10d.

When the valve 20 is in the closed first position, as shown in FIG. 10a, any fluid pressure from the fluid supply device acts towards the first piston area 22 only. When the valve 20 is in the open second position, as shown in FIG. 10d, the fluid pressure acts on both the first piston area 22, and the additional annular and circular second piston areas 24, 24'.

For all three embodiments of the valve 20 discussed above, the following applies:

When a fluid pressure acting on the first piston area 22 provides a force exceeding an oppositely directed force from the spring 30, the piston arrangement 21 will move from a closed first position, as shown in FIGS. 1b, 9a and 10a, to an open second position, as shown in for example FIGS. 2b, 9c and 10d. When the valve 20 opens, referring now to the embodiment shown in FIG. 2b, the fluid will flow through the apertures 23 into the hollow piston member 25 and through the outlet 13 of the valve 20. In the embodiments shown in FIGS. 9c 10d, however, the fluid will flow on the outside of the piston member 25 and through the outlet 13 of the valve 20.

Due to the additional second piston area 24, and for the embodiment shown in FIG. 10d, the additional circular second piston area 24', which adds (or in FIG. 10d add) to the first piston area 22 once the valve 20 opens, the fluid pressure required for keeping the valve 20 in the open second position becomes less than the fluid pressure required for opening the valve 20. This means that the valve 20 may be configured for holding a desired fluid column, further implying that the fluid pressure required for opening the valve 20 may be reduced once the valve 20 starts opening, which allows the valve 20 to operate at a reduced fluid pressure while feeding fluid through the outlet 13 of the valve 20. A reduced pumping pressure results in reduced differential pressure across the valve 20, which may have a positive effect on any erosion of the valve 20, and thus on the operating lifetime of the valve 20. A reduced differential pressure across the valve 20 may further have a positive effect with respect to reduced turbulent flow and reduced cavitation. From the embodiments of the valve 20 discussed above, the embodiment shown in FIGS. 10a to 10d provides the largest difference between the first piston area 22 and the sum of area of the first piston area 22 and additional annular and circular second piston areas 24, 24'. A large difference between the first piston area 22 and the sum of the first piston area 22 and the additional annular and circular second piston areas 24, 24' has the positive effect that the resistance from the spring 30 can be reduced as compared with embodiments wherein the differences between the areas 22, 24 are less, as shown in FIGS. 9a to 9c, and particularly in FIGS. 1a and 2a. A reduced resistance from the spring has the effect that the fluid supply pressure can be reduced. A reduced supply pressure may be positive with respect to the lifetime of the valve, as discussed above. As an alternative to reducing the resistance from the spring 30, and thus the fluid supply pressure, the fluid supply pressure for opening the valve 20 can be increased.

Independently of reducing the resistance from the spring 30 or increasing the pressure from the fluid supply device, typically by increasing the pumping pressure, the following positive effect is achieved: Due to the relatively large differences between the first piston area 22 and the sum of the first piston area 22 and the additional annular and circular second piston areas 24, 24' shown in FIGS. 10a to 10d, a correspondingly large difference in pressure from the fluid supply device may be applied for opening the valve 20 and keeping the valve 20 open. Thus, a fluid supply pressure from for example a pumping device may be considerably reduced once the valve 20 opens.

In the embodiments shown, the chamber 32 housing the valve spring 30 is configured to contain a substantially incompressible fluid, for example an oil. The chamber 32 is in fluid communication with a restrictor arrangement 40 for delaying closing of the valve 20 to allow a fluid supply pressure to bleed off. Seals for preventing leakages are shown in the figures, but the seals are not discussed in any further details given that such seals will be apparent for a person skilled in the art.

In the embodiments shown, the restrictor arrangement 40 comprises a closing delay nozzle 42 extending from a lower portion of the chamber 32, further through an annular lip portion or piston 44 extending radially with respect to valve body 12, and onto a variable volume reservoir 46, as best seen in FIGS. 1b and 2b. Alternatively, however, the restrictor arrangement may comprise for example a flow choke valve or other means commercially available in the marked for reducing, for example, a flow velocity through the restrictor arrangement 40 and thus reduce the closing speed of the valve 20. Alternatively, or additionally, the restrictor arrangement 40 may be configured for delaying return of the piston arrangement from its open second position to its closed first position until a predetermined time has lapsed after the pressure of the fluid upstream of the valve has been reduced below the predetermined level.

The variable volume reservoir 46 is in the embodiment shown in FIG. 2b defined by a piston member lip 48 protruding radially outward from the piston member 25, and the internal wall of the valve housing 12. The piston member lip 48 has an active face for receiving any fluid from the chamber 32, and a passive face opposite the active face. The passive face of the piston member lip 48 is in fluid communication with ambient air.

In the embodiments shown in FIGS. 9c and 10d, the variable volume reservoir 46 is defined by the annular lip portion 44 protruding radially inward from the piston housing 251, an internal wall of the piston housing 251, a shoulder portion of the body 12, and the external wall of the valve body 12

When the valve 20 is in the first closed position, as shown in FIGS. 1b, 9a and 10a, a volume of the variable volume reservoir 46 is close to zero.

When the valve 20 opens in response to a fluid pressure, a volume of the chamber 32 is reduced and any fluid within the chamber 32 is urged from the chamber 32 and into the variable volume reservoir 46 via the closing delay nozzle 42. In the embodiment shown in FIG. 2b the piston arrangement 21 has moved axially downward to a position wherein the piston member lip 48 abuts against a shoulder at a lower end portion of the valve housing 12 and wherein a volume of the variable volume reservoir 46 is at its maximum.

In FIGS. 9c and 10d, the piston arrangement 21 has moved axially downward to a position wherein a shoulder of the valve housing 251 abuts against a shoulder at a lower end portion of the valve body 251.

Figure 3A:
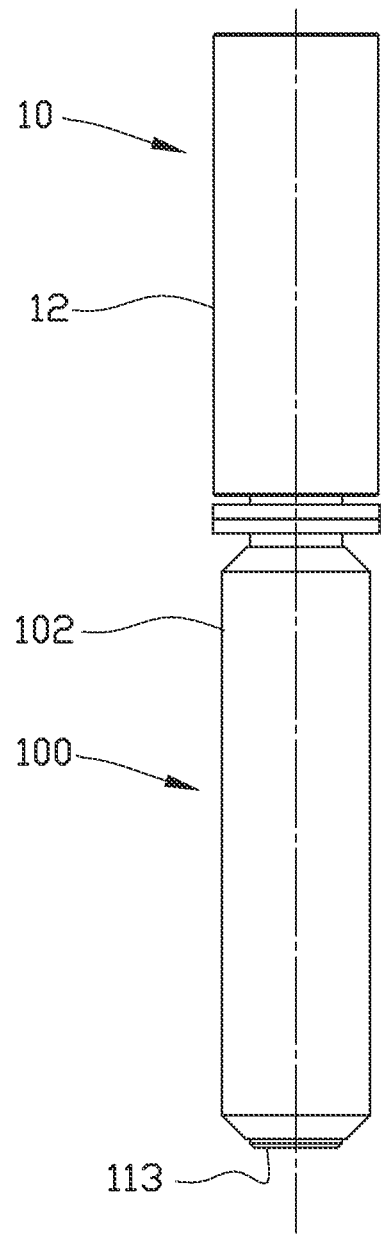
FIG. 3a shows the valve in FIG. 1a forming part of a first tubing portion connected to a second tubing portion comprising an extensible tubing.
Figure 3B:
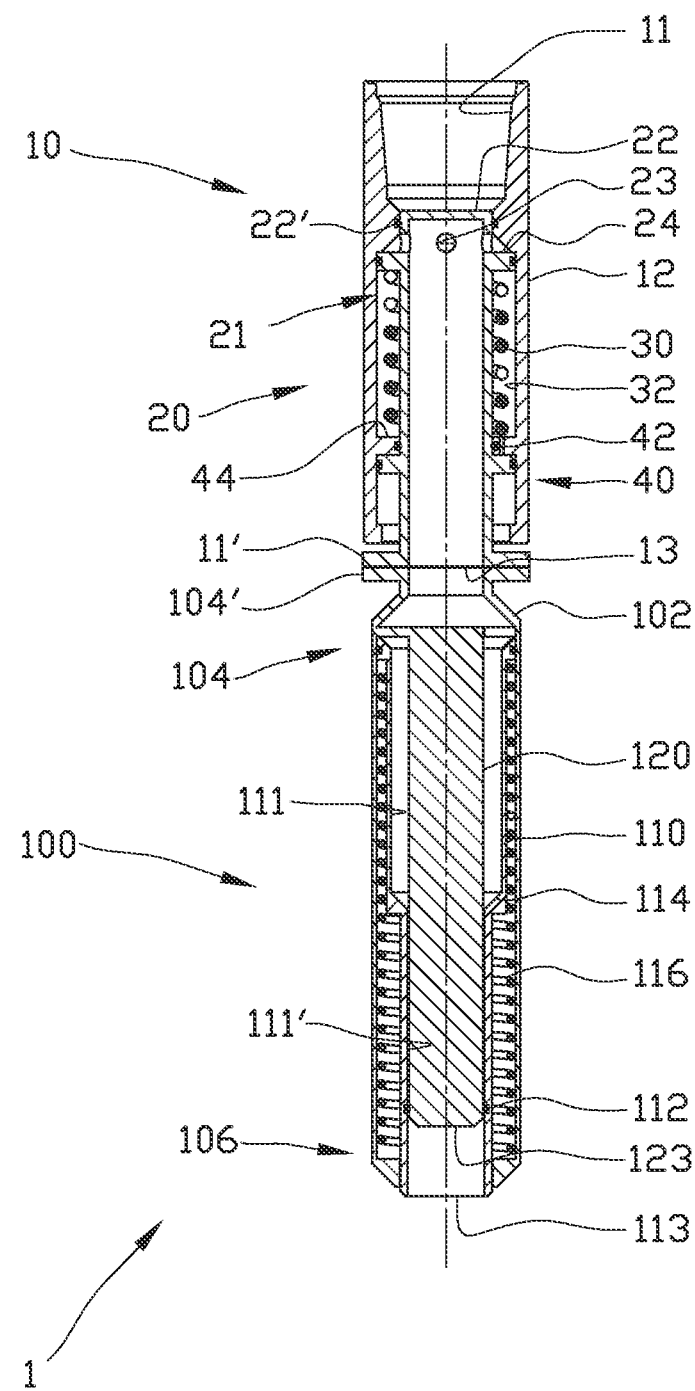

In one embodiment, the closing delay nozzle 42 is provided with a check-valve (not shown) configured for providing one-way delay, and only so that substantially no delay is provided when the valve 20 opens and moves from the position shown in, for example, FIG. 2b to the position shown in FIG. 3a.

Turning now to FIG. 3a et seq, which show the valve 20 forming part of an extensible tubing 1. In the extensible tubing 1, hereinafter also denoted tubing 1, the valve 20 forms part of a first tubing portion 10, which comprises the valve 20 shown in FIGS. 1a to 2b, however with a flange 11' added to a lower portion of the piston member 25, i.e., added to the outlet 13 of the valve 20. The flange 11' has been connected to a mating flange 104' arranged at a first end portion 104 of a second tubing portion 100, for example by mean of bolts (not shown). In the embodiments shown, the first tubing portion 10 and the second tubing portion 100 are thus separable. An advantage of providing separable tubing portions 10, 100 is that the tubing 1 can be easily adapted to special needs without having to replace the complete tubing 1. For example, if another length of the second tubing portion 100 is desired, only the second tubing portion 100 may be replaced. If another type of valve 20 is desired (configured, for example, for a different opening/closing pressure), or if the threads in the inlet are damaged, or if another dimension or type of inlet 11 is required, only the first tubing portion 10 may be replaced.

Although the valve 20 shown in FIGS. 3a to 7b is the valve according to the embodiment shown in FIGS. 1a to 2b, it should be clear that the alternative valves 20 shown in FIGS. 9a to 9c, or in FIGS. 10a to 10d, may form part of the extensible tubing 1.

Figures 5A, 5B:
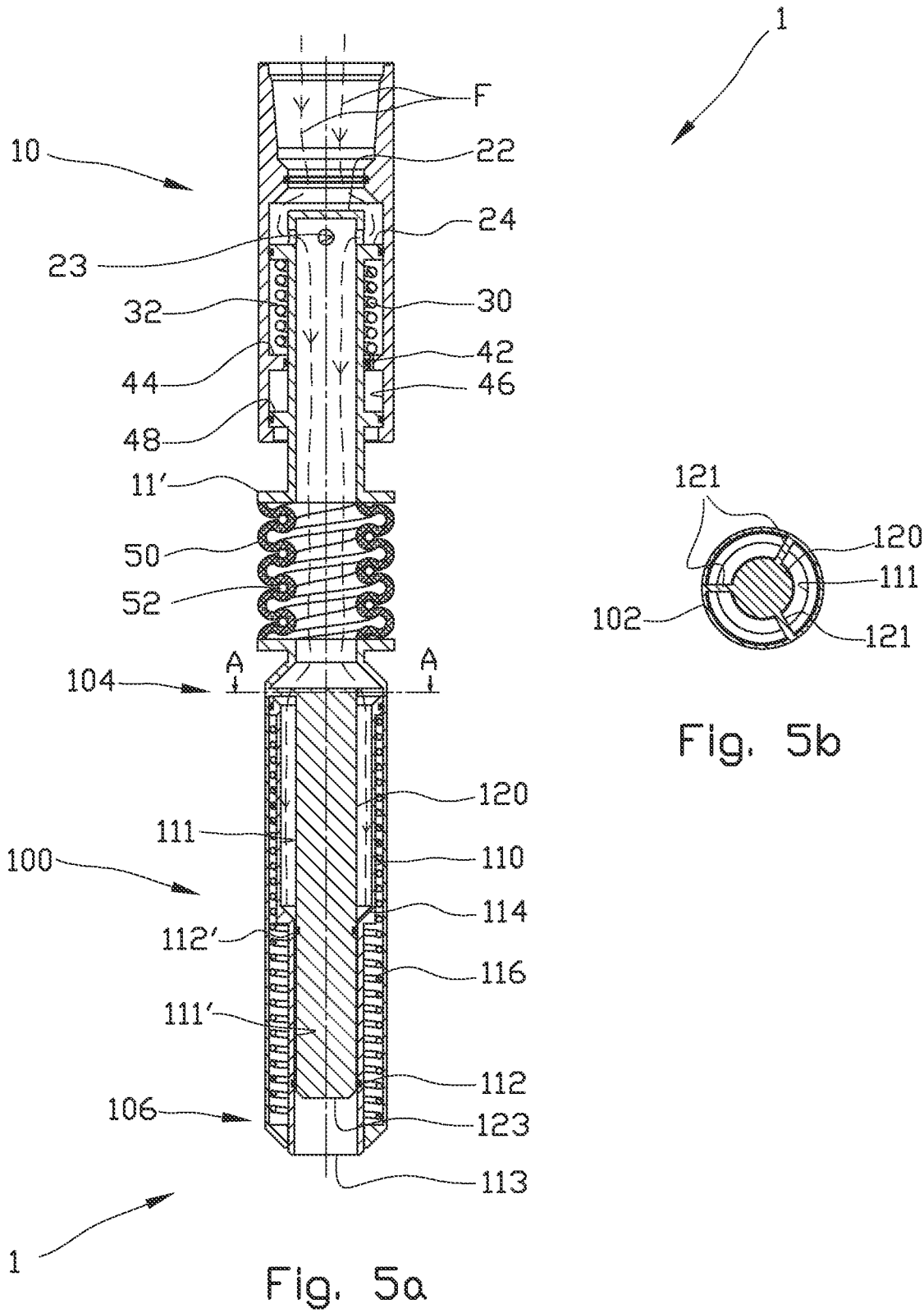

When the valve 20 in the embodiment shown in FIGS. 1a to 2b opens, the fluid will flow through the apertures 23 into the hollow piston member 25, further through the outlet 13 of the valve 20, and then into the second tubing portion 100. In FIG. 5a, such a fluid flow is illustrated by dotted lines F. The fluid flows past core securing fins 121 connecting the core 120 to a surrounding housing 102, as best seen in FIG. 5b.

When the valves 20 in the embodiments shown in FIGS. 9a to 10d opens, the fluid will flow on the outside of the piston member 25.

The second tubing portion 100 comprises said housing 102 having said first end portion 104 and also a second end portion 106 located axially opposite the first end portion 104.

A core 120 is arranged inside the housing 102. In the embodiments shown, the tubing 1 has a circular cross-section and the core 120 is made from a circular, solid rod arranged coaxially within the housing 102. A top or upstream portion of the core 120 is secured to a portion of the housing 102, whereby the core 120 may be considered as "hanging" within a housing 102 having a substantially vertical longitudinal axis, as shown, or the core 120 may be considered as "cantilevered" within a housing 102 having a substantially horizontal longitudinal axis.

The second tubing portion 100 further comprises a pipe 110 arranged between the housing 102 and the core 120. The pipe 110 is axially movable between a retracted position wherein an annular seal 112 prevents fluid from passing between the core 120 and the pipe 110, and an extended position wherein the seal 112 does not prevent fluid from passing between the core 120 and the pipe 110. FIGS. 3a-5a and 8a show the pipe 110 being in the retracted position, while FIGS. 6-7b and 8b show the pipe 110 being in the extended position.

The second tubing portion 100 further comprises an internal piston 114 forming part of the pipe 110, and a second tubing portion biasing means 116, here in the form of a spring, configured for urging the pipe 110 towards its retracted position.

The pipe 110 is movable from its retracted position towards its active position when the valve 20 (in the first tubing portion 10) is in the second open position, and when a fluid pressure acting on the piston 114 provides a force exceeding an opposite force from the second tubing portion biasing means or spring 116 configured for urging the pipe 110 towards its retracted position.

In the embodiment shown, the piston 114 is constituted by a transition zone 114 from a larger first pipe portion 111 having a first flow area, and a smaller second pipe portion 111' having a second flow area being smaller than the first flow area. Hereinafter, the larger first pipe portion will also be denoted first piping portion 111, and the smaller second piping portion 111' will also be denoted second piping portion 111'. The first piping portion 111 has an internal diameter being larger than an internal diameter of the second piping portion 111' located downstream of the first piping portion 111.

A cross-sectional area defined by an external surface of the core 120 is smaller than a cross sectional area defined by an internal surface of the second piping portion 111', thereby providing a radial gap for allowing fluid flow between the core 120 and the second piping portion 111'. In the embodiment shown, an annular space is thus defined between the core 120 and the second piping portion 111'. The annular space is larger than the space required for fitting the core 120 within the second piping portion 111'. In a preferred embodiment, a flow area of the annular space is equal to or larger than the flow area of the second piping portion 111'.

Figure 6:
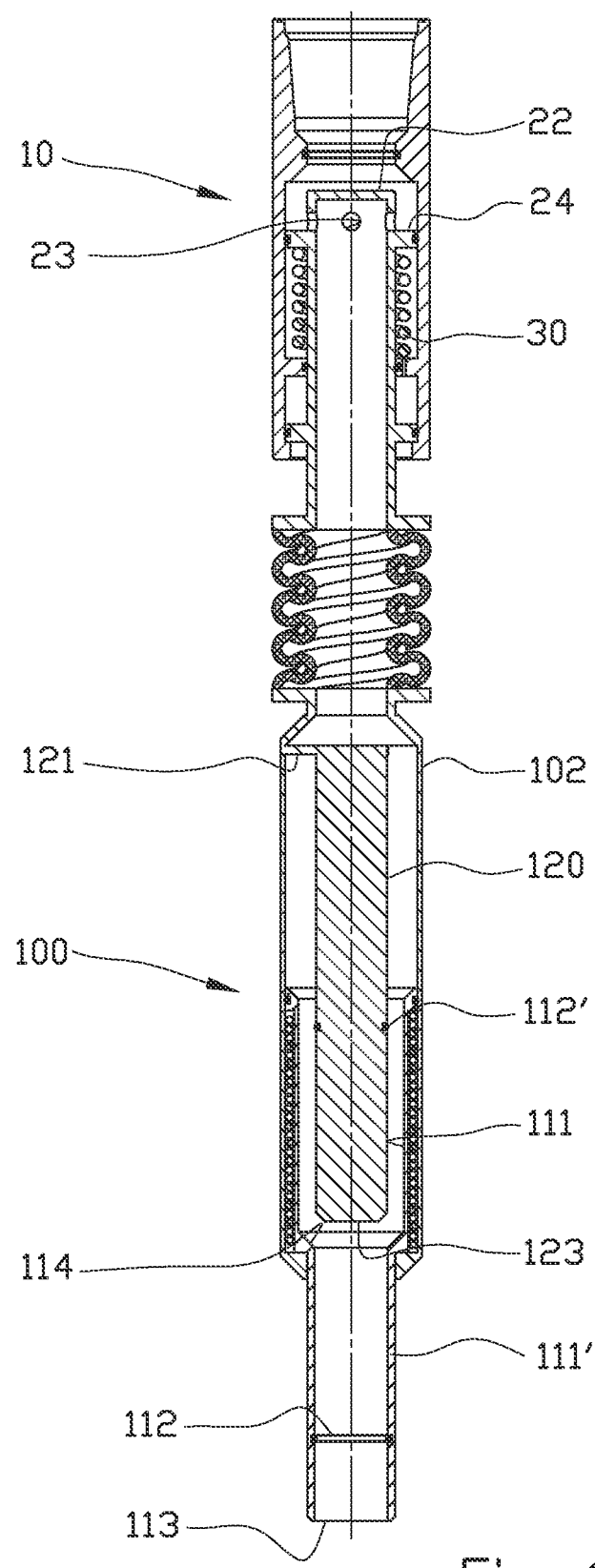
FIG. 6 shows, in a somewhat smaller scale, a view wherein the extensible tubing has moved from the retracted position, which is shown in FIG. 5a, to a fully extended position.

When fully retracted, as shown inter alia in FIGS. 3a-5a, the annular seal 112 protruding from an inner surface of the second piping portion 111' abuts against a side portion of the core 120. The annular space between the core 120 and the second piping portion 111' is thus sealed and fluid is prevented from passing through the annular space. In FIGS. 5a and 6, a further annular seal 112' is arranged in a recess on the core 120. The further annular seal 112' is arranged on the core 120 to provide a "double seal" once the piston 114 of the second tubing portion 100 has passed the annular seal 112' during retraction of the pipe 110 of second tubing portion 100. Such an arrangement of a further seal 112' may be applicable also for the embodiments shown in FIGS. 3b, 4b, and 7b.

In an alternative embodiment (not shown), the second tubing portion 100 may be provided with the seal 112' arranged in the recess of the core 120 only. In such an alternative embodiment with the seal 112' arranged in the recess on the core 120 only, the seal 112' may be arranged closer to the free end portion 123 of the core 120 than to the position shown in FIGS. 3a and 4. However, the axial position of the seal 112' shown in FIGS. 5a and 6 has been optimized with respect to drainage of fluid from within the tubing 1 when the pipe 110 retracts from its extended position. The drainage takes place substantially until the pipe 110 is fully retracted.

The annular space defined between the core 120 and the second piping portion 111', as well as the arrangement of one or both of the seal(s) 112, 112', are advantageous with respect to drainage of fluid from within the extensible tubing 1 when the pipe 110 retracts from its extended position, as will be discussed below.

In the embodiments shown in FIG. 3a et seq, the second tubing portion biasing means 116 for urging the pipe 110 towards its retracted position (see for example FIG. 3b) is in the form of a helical spring 116 adapted to provide a desired resistance against an opening force defined by a fluid pressure and the area of the piston 114. As an alternative to a spring, the biasing means may be in the form of a compressible fluid, such as a gas.

In some applications, however, the extensible tubing 1 may be subject to a considerable hydrostatic pressure. An example of one such application is a casing running operation in which a fluid column acting on the valve 20 in the extensible tubing 1 may be as much as 40 meters, or even more. The fluid may have a specific gravity of up to 2.2 times that of water. It is possible, for example, to design the tubing 1 (see FIG. 1b) with a second tubing portion biasing means, for example a spring 116, capable of resisting a force from a static fluid column of 40 meters having a specific gravity of 2.2. The height of the fluid column and its specific gravity will vary considerably, for example from one rig to another. Thus, a great number (or varieties of configurations) of second tubing portions 100 would be required for servicing the marked. Using a valve that forms part of the fluid supplying device to control supply of fluid to the inlet 11 of the tubing 1, could therefore be one way of avoiding or mitigating the force effect of a fluid column acting on the inlet 11 of the tubing 1. In a casing running operation, an IBOP valve (IBOP—Internal Blowout Preventer) arranged in a top drive (see item 206 in FIGS. 8a and 8b) would be capable of holding such a fluid column. However, an IBOP valve is a safety device that should be used in an emergency situation only, and a rig operator would normally not allow regular use of an IBOP valve for controlling fluid supply in a casing running operation, or in a drilling operation. Advantageously, instead, the present valve 20 shown in the embodiment could serve the purpose of controlling the fluid from the fluid supplying device.

Figure 4A:
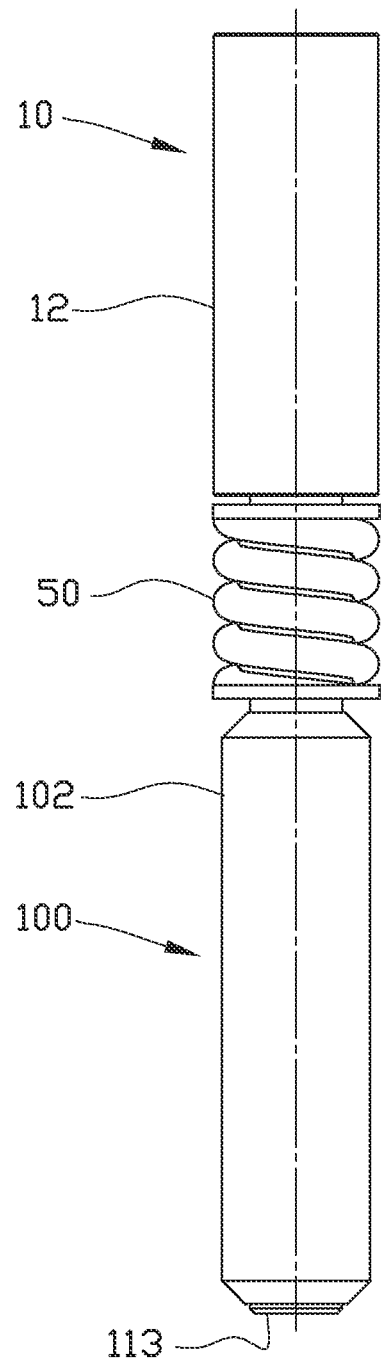
FIG. 4a shows a view of an embodiment of the present valve connected to an extensible tubing via a flexible pipe, wherein the valve is in a closed first position and the extensible tubing is in a retracted position.
Figure 4B:
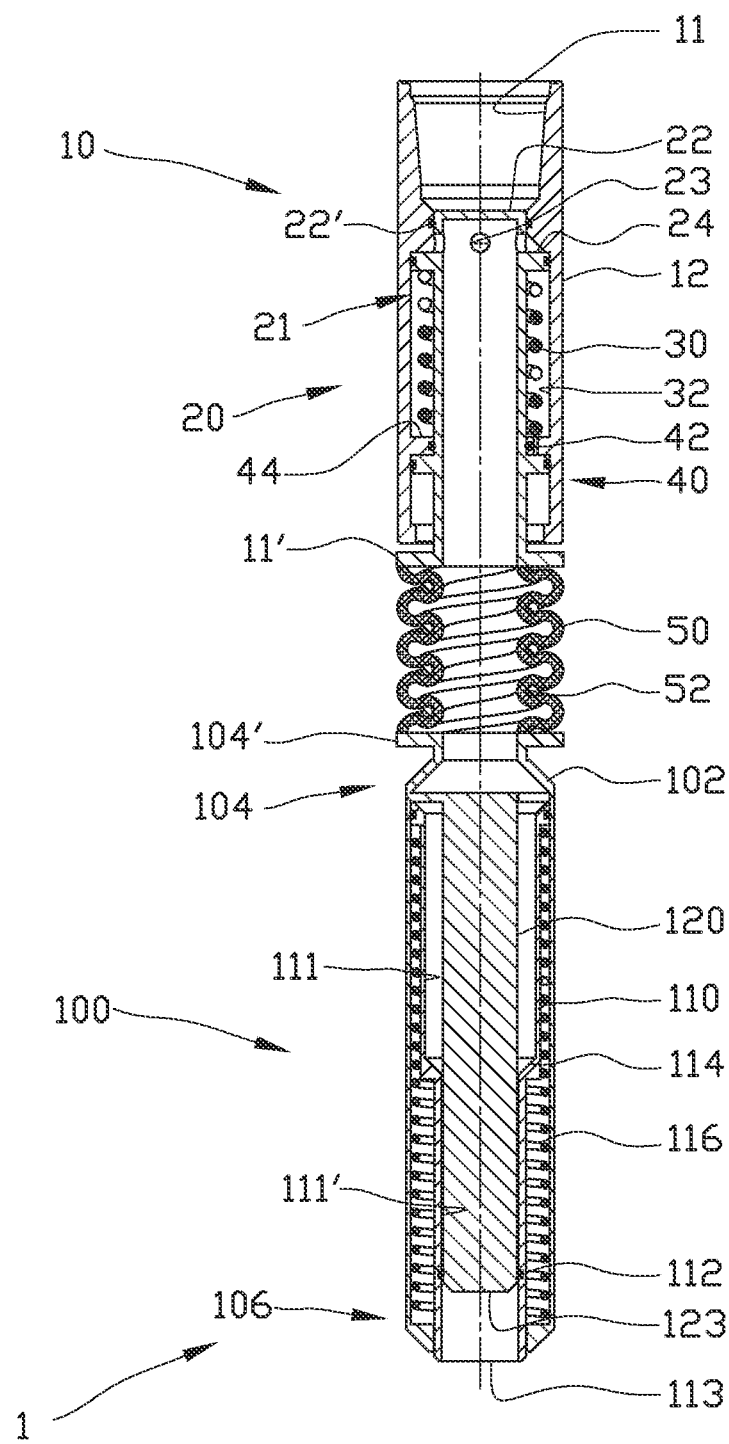

In the embodiments shown in FIG. 4a et seq, the valve 20 forming the first tubing portion 10 is operatively connected to the second tubing portion 100 via a flexible pipe 50. The flexible pipe 50 may absorb any impacts that may arise during operation of the tubing 1. Further, the flexible pipe 50 may allow the first tubing portion 10 to move and become non-coaxial with respect to the second tubing portion 100, which is a situation that may arise during operation.

If the fluid pressure acting on the piston 114 of the pipe 110 provides a force exceeding an oppositely directed force from the spring 116, the pipe 110 will move from the retracted position shown in FIG. 5a to the extended position shown in, for example, FIG. 6. In FIG. 6, the pipe 110 is in its fully extended position, wherein the piston 114 is positioned axially downstream of a free end portion 123 of the core 120, thereby providing a fully open flow passage through the tubing 1.

Figure 7A:
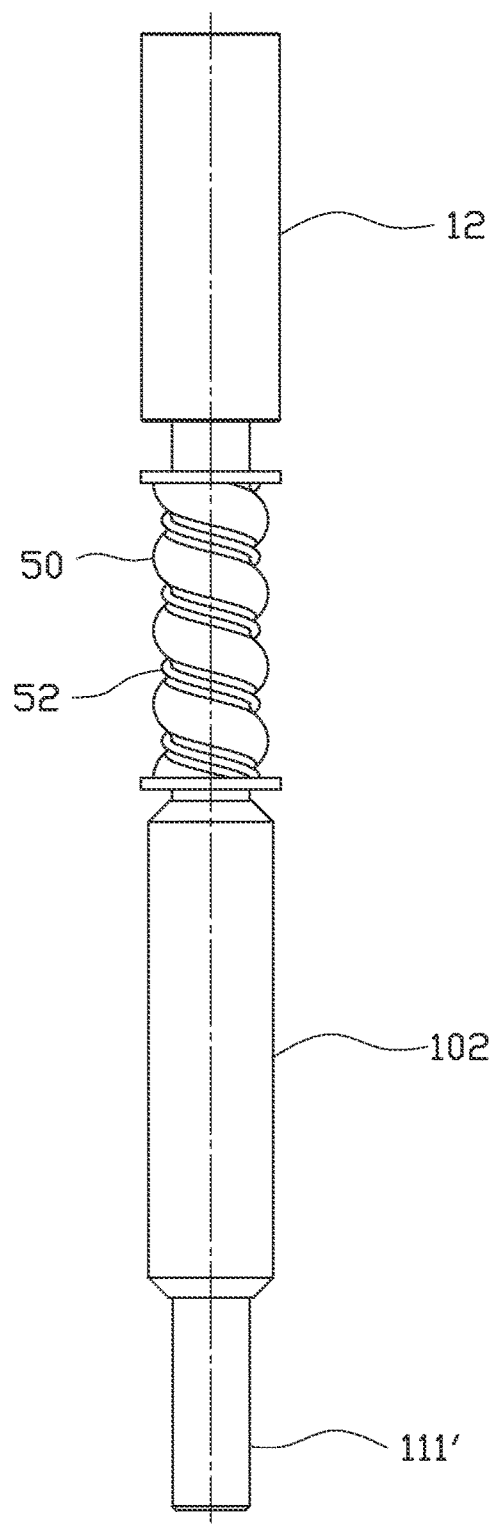
FIG. 7a shows, in a somewhat smaller scale, a view of an assembly comprising the valve, the flexible pipe, and the extensible tubing being in a fully extended position.
Figure 7B:
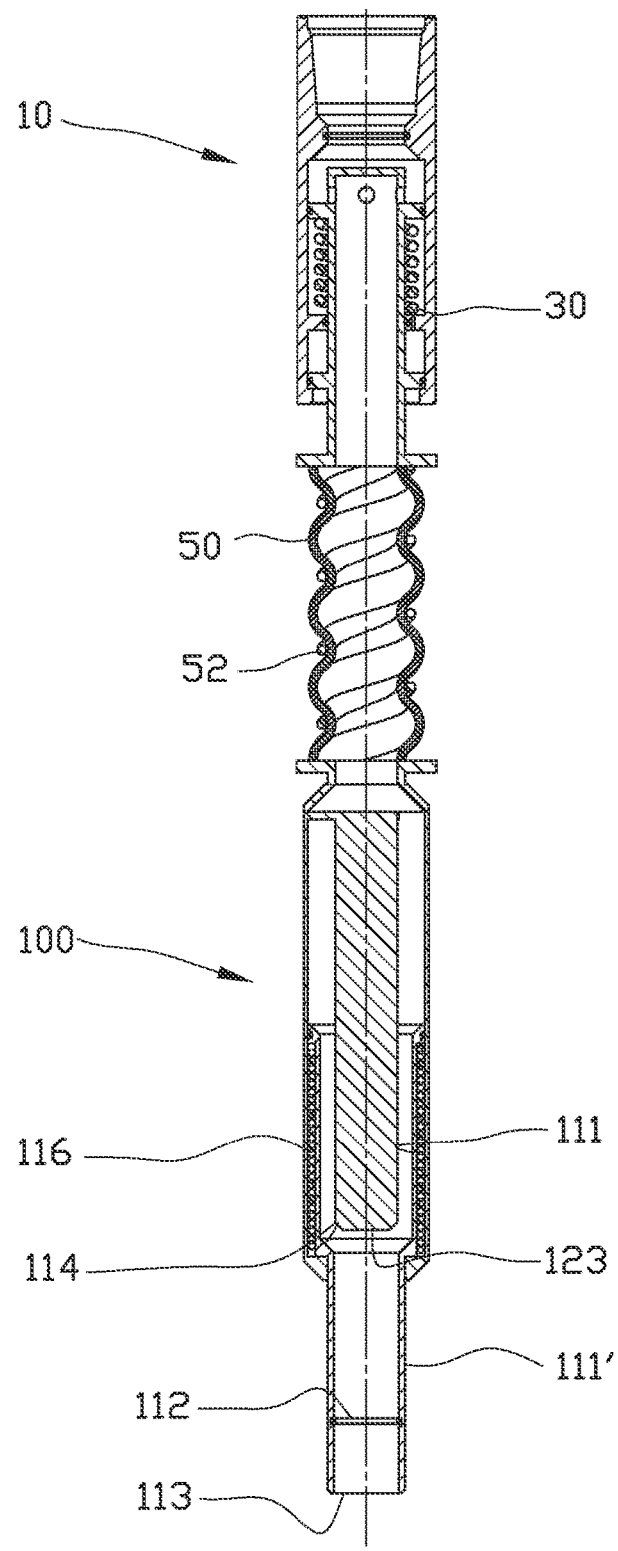

In FIGS. 7a and 7b, a force from the fluid flow through the tubing 1 has exceeded counteracting forces from the spring 30 of the valve 20, the spring 116 of the second tubing portion 100, and a force from a spring 52 arranged in connection with the flexible pipe 50. In FIGS. 7a and 7b, the tubing 1 is at its maximum extension, which is provided by means of the extension of the flexible pipe 50 in addition to the extension of the second tubing portion 100, as shown in FIG. 6.

FIGS. 8a and 8b show, in a smaller scale and partially in cross-section, an embodiment of an extensible tubing 1 in which the present valve 20 forms part of the extensible tubing 1.

In FIGS. 8a and 8b, the extensible tubing 1 is in a retracted position and extended position, respectively, above a top portion of a casing string 230 during a casing running operation.

In the example shown in FIGS. 8a and 8b, the extensible tubing 1 is operatively connected to a top drive 200 of a rig. The extensible tubing 1 is of the type shown in FIGS. 4a-7b.

A top portion of the first tubing portion 10, which comprises the present valve 20, is connected to a saver sub 202 housed within a skirt 204. For illustrative purposes, the skirt 204 is shown partially in section, and the top portion of the extensible tubing 1 (which comprises the valve 20) is housed within a lower portion of the skirt 204. The top drive 200 further comprises an IBOP valve 206 (IBOP-Internal Blowout Preventer) configured for closing a fluid flow in the event of an emergency situation, and particularly in a drilling operation wherein fluid may flow from a subsea reservoir and up to the rig.

An elevator 220, which is operatively connected to the top drive 200 via a pair of bails 222, carries the casing string 230. The casing string 230 is made up by connecting casing sections 232 (two sections shown) on top of the casing string 230 during a casing running operation, as will be appreciated by a person skilled in the art.

During the casing running operation, a balancing fluid must be supplied to the casing string 230. By means of the extensible tubing 1, the casing string 230 can be continuously filled, both during make-up of the connection of two casing sections 232 and thereafter during running into the well.

In FIG. 8a, the valve 20 is in the closed first position, whereby the extensible tubing 1 is in a fully retracted position in which both the pipe 110 of the second tubing portion 100 and the flexible pipe 50 are in retracted positions. Thus, in FIG. 8a, there is no fluid flow through the tubing 1.

In FIG. 8b, a fluid pressure of the fluid located upstream of the first tubing portion 10 has been increased, for example by means of a pump operatively connected to the fluid supplying device. The fluid pressure has been increased to a level wherein the valve 20 of the first tubing portion 10 has been urged from a closed first position (see details in FIG. 4b) to an open second position (see details in FIG. 5a).

When the valve 20 opens, fluid flows into the pipe 110 of the second tubing portion 100. If the fluid flow pressure exceeds the force from the spring 116 within the second tubing portion 100, and also the force from the spring 52 of the flexible pipe 50, both the pipe 110 and the flexible pipe 50 are displaced axially to their extended positions. In said extended positions, as shown in FIG. 8b, the free end 113 of the (smaller) second pipe portion 111' has entered into a top portion of the uppermost casing section 232. Thus, in FIG. 8b, the extensible tubing 1 is shown in its extended position, as also shown in further details in FIG. 7b. In FIG. 8b, there is a sideway clearance between the second pipe portion 111' and the casing section 232 so that the casing section 232 does not represent any obstruction when the extensible tubing 1 is moved from its fully retracted position (see FIG. 8a) to its extended position, and from its extended position to its fully retracted position. The sideway clearance has a further effect that any sideway movement of the extensible tubing 1 does not influence any axial alignment between the uppermost casing section 232 and the casing secured to the drill floor 240 via slips 242, during make-up of the connection of the casing sections 232. It should be noted that the sideway clearance is preferred also in an embodiment wherein the extensible tubing 1 is not provided with the flexible pipe 50.

From the disclosure herein, it should be appreciated that the valve 20 according to the invention may be utilized to automatically control an extensible tubing 1 used, for example, in a casing running operation, as shown in FIGS. 8a and 8b.

By means of the valve 20, the extensible tubing 1 may be controlled by the fluid pressure within the fluid supplying device only. In one embodiment, at least some of the fluid within the extensible tubing 1 is allowed to drain during movement from its extended position to its fully retracted position, whereby any spill of fluid is substantially eliminated. The valve 20 according to the invention is configured to allow the fluid pressure of the fluid flowing into the inlet of the extensible tubing 1 to be reduced once the valve 20 has started opening.

It should be noted that the above-mentioned embodiments illustrate rather than limit the invention, thereby allowing those skilled in the art to design many alternative embodiments without departing from the scope of the appended claims. In the claims, any reference signs placed between parentheses shall not be construed to limit the claim. Use of the verb "comprise" and its conjugations do not exclude the presence of elements or steps additional to those stated in a claim. The article "a" or "an" preceding an element does not exclude the presence of a plurality of such elements.

The invention claimed is:
1. A valve for controlling fluid flow between a fluid supplying device and a fluid receiving device, the valve having an inlet for connection to the fluid supplying device and for receiving a fluid therefrom, and an outlet,
wherein the valve comprises a piston arrangement slidable with respect to a valve body,
wherein the piston arrangement is slidable between a closed, first position preventing fluid from passing the valve upon exposure to a fluid pressure being below a predetermined level, and an open, second position providing fluid communication between the inlet and the outlet upon exposure to a fluid pressure exceeding the predetermined level,
wherein the piston arrangement has a first piston area when the valve is in the closed first position, and an additional second piston area when the valve is in the open second position,
wherein the valve further comprises a sealed restrictor arrangement for delaying closing of the valve to allow a fluid supply pressure to bleed off,
wherein the piston arrangement comprises a hollow piston member having a longitudinal axis and provided with at least one aperture in a wall of the hollow piston member, and
wherein the at least one aperture is provided in a portion of said wall defined between the first piston area and the additional second piston area along the longitudinal axis of the hollow piston member, whereby fluid communication between the inlet and the outlet is provided via the at least one aperture,
wherein the valve forms part of an extensible tubing having a first tubing portion and a second tubing portion,
wherein the first tubing portion comprises the valve,
wherein the outlet of the valve is configured for controlling fluid flow into an inlet of the second tubing portion, and
wherein the second tubing portion comprises:
a housing having a first end portion for receiving fluid from the outlet of the valve, and a second end portion;
a core arranged inside the housing and secured thereto;
a pipe arranged between the housing and the core, the pipe being axially movable between a retracted position wherein a seal prevents fluid from passing between the core and the pipe, and an extended position wherein the seal does not prevent fluid from passing between the core and the pipe;
a piston forming a part of the pipe; and
a second tubing portion biasing means configured for urging the pipe towards its retracted position,
wherein the pipe is movable towards its extended position upon exposure to a fluid flowing from the first tubing portion into the second tubing portion and providing a fluid pressure force exceeding an opposite force from the second tubing portion biasing means.
2. The valve according to claim 1, wherein a valve biasing means is provided in a chamber defined between a portion of the piston arrangement and a portion of the valve body.
3. The valve according to claim 1, wherein when the valve is in the open second position a first portion of the hollow piston member is arranged inside the valve body and a second portion of the hollow piston member is arranged outside the valve body, and when the valve is in the closed first position both the first portion of the hollow piston member and the second portion of the hollow piston member are arranged inside the valve body.
4. The valve according to claim 1, wherein the restrictor arrangement is configured for reducing a closing speed of the valve.
5. The valve according to claim 1, wherein the restrictor arrangement comprises a closing delay nozzle configured for communicating an incompressible fluid between two or more fluid reservoirs in response to movement of the piston arrangement.
6. The valve according to claim 5, wherein the restrictor arrangement is configured for delaying return of the piston arrangement from its open, second position to its closed, first position until a predetermined time has lapsed after reducing the pressure of the fluid upstream of the valve below the predetermined level.
7. The valve according to claim 1, wherein the piston comprises a transition zone from a larger, first pipe portion having a first flow area, and a smaller second pipe portion having a second flow area being smaller than the first flow area.
8. The valve according to claim 7, wherein a cross sectional area defined by an external surface of the core is smaller than a cross sectional area defined by an internal surface of the smaller, second pipe portion, thereby providing a radial gap for allowing fluid flow between the core and the smaller, second pipe portion.
9. The valve according to claim 7, wherein the smaller, second pipe portion has a free end, and wherein the seal is arranged within the smaller, second pipe portion and closer to its free end than to the piston.
10. The valve according to claim 1, wherein the core has a free end portion pointing away from the first tubing portion, and wherein the piston is positioned on the pipe so as to extend beyond the free end portion of the core when the pipe is in its extended position.
11. The valve according to claim 1, wherein the first tubing portion is a separate tubing portion connected to the second tubing portion.
12. A method of controlling fluid flow between a fluid supplying device and a fluid receiving device, wherein the method comprises the steps of:
providing a valve according to claim 1; and
connecting an inlet of the valve to the fluid supplying device.
13. The valve according to claim 1, wherein characteristics of a valve biasing means define said predetermined level of fluid pressure, and wherein the restrictor arrangement is configured for reducing a closing speed of the valve.
14. A valve for controlling fluid flow between a fluid supplying device and a fluid receiving device, the valve having an inlet for connection to the fluid supplying device and for receiving a fluid therefrom, and an outlet,
wherein the valve comprises a piston arrangement slidable with respect to a valve body,
wherein the piston arrangement is slidable between a closed, first position preventing fluid from passing the valve upon exposure to a fluid pressure being below a predetermined level, and an open, second position providing fluid communication between the inlet and the outlet upon exposure to a fluid pressure exceeding the predetermined level,
wherein the piston arrangement has a first piston area when the valve is in the closed first position, and an additional second piston area when the valve is in the open second position, wherein the valve further comprises a sealed restrictor arrangement for delaying closing of the valve to allow a fluid supply pressure to bleed off, wherein the valve forms part of an extensible tubing having a first tubing portion and a second tubing portion, wherein the first tubing portion comprises the valve, and wherein the outlet of the valve is configured for controlling fluid flow into an inlet of the second tubing portion, wherein the first tubing portion is a separate tubing portion connected to the second tubing portion, and wherein the first tubing portion is connected to the second tubing portion via a flexible pipe.

15. The valve according to claim 14, wherein the flexible pipe is axially extensible between a retracted position and an extended position.

16. The valve according to claim 15, wherein the flexible pipe comprises a flexible pipe biasing means configured for urging the flexible pipe towards a retracted position upon exposure to an opposite tension force between the first tubing portion and the second tubing portion being less than a biasing force of the flexible pipe biasing means.

17. A valve for controlling fluid flow between a fluid supplying device and a fluid receiving device, the valve having an inlet for connection to the fluid supplying device and for receiving a fluid therefrom, and an outlet, wherein the valve comprises a piston arrangement slidable with respect to a valve body, wherein the piston arrangement is slidable between a closed, first position preventing fluid from passing the valve upon exposure to a fluid pressure being below a predetermined level, and an open, second position providing fluid communication between the inlet and the outlet upon exposure to a fluid pressure exceeding the predetermined level, wherein the piston arrangement has a first piston area when the valve is in the closed first position, and an additional second piston area when the valve is in the open second position, wherein the valve further comprises a sealed restrictor arrangement for delaying closing of the valve to allow a fluid supply pressure to bleed off, wherein the valve forms part of an extensible tubing having a first tubing portion and a second tubing portion, wherein the first tubing portion comprises the valve, and wherein the outlet of the valve is configured for controlling fluid flow into an inlet of the second tubing portion, and wherein the second tubing portion comprises:
    a housing having a first end portion for receiving fluid from the outlet of the valve, and a second end portion;
    a core arranged inside the housing and secured thereto;
    a pipe arranged between the housing and the core, the pipe being axially movable between a retracted position wherein a seal prevents fluid from passing between the core and the pipe, and an extended position wherein the seal does not prevent fluid from passing between the core and the pipe;
    a piston forming a part of the pipe; and
    a second tubing portion biasing means configured for urging the pipe towards its retracted position;
    wherein the pipe is movable towards its extended position upon exposure to a fluid flowing from the first tubing portion into the second tubing portion and providing a fluid pressure force exceeding an opposite force from the second tubing portion biasing means.

* * * * *